United States Patent [19]

Tilsner

[11] Patent Number: 4,971,283

[45] Date of Patent: Nov. 20, 1990

[54] WEDGE DEVICE FOR USE IN MOUNTING LIGHTS

[76] Inventor: Herbert L. Tilsner, 1663 6th St., Port Hueneme, Calif. 93041

[21] Appl. No.: 421,954

[22] Filed: Oct. 16, 1989

[51] Int. Cl.$^5$ ............................................. F04G 3/00
[52] U.S. Cl. .............................. 248/231.9; 248/231.3; 411/344; 411/346
[58] Field of Search ............... 248/27.1, 231.9, 231.91, 248/231.3, 231.2, 558, 207, 925; 411/79, 76, 77, 55, 344, 346, 345; 24/136 B; 403/374

[56] References Cited

U.S. PATENT DOCUMENTS

| | | | |
|---|---|---|---|
| 198,937 | 1/1878 | Gott | 411/344 |
| 638,384 | 12/1899 | Dyer | 411/344 |
| 1,386,202 | 8/1921 | Peterson | 411/346 |
| 1,459,542 | 6/1923 | McCathron | 411/79 X |
| 2,673,055 | 3/1954 | Riemann | 248/231.3 |
| 4,082,241 | 4/1978 | Burkey | 248/925 X |
| 4,539,861 | 9/1985 | Nishikawa | 403/374 X |
| 4,644,617 | 2/1987 | Tupper et al. | 411/344 X |
| 4,830,316 | 5/1989 | Nehl | 248/27.1 |

Primary Examiner—David L. Talbott
Assistant Examiner—Daniel Hulseberg
Attorney, Agent, or Firm—Edward A. Sokolski

[57] ABSTRACT

A wedge device particularly suitable for use in mounting a swimming pool light in a niche formed in a wall of the pool has a wedge member and a drive member for use in driving the wedge member between the side of the light and the wall of the niche. The drive member is pivotally mounted on the wedge member for limited slidable freedom of motion laterally as well as rotatable motion by means of a pair of trunnions which extend therefrom and fit into cylindrical sleeve bearings formed in the wedge member. A screw member threadably engages the drive member and is inserted through an aperture in the mounting ring for the light. When the screw is tightened against the mounting ring, it draws the wedge member against a side of the light and the wall of niche thereby wedging the light in place. The drive member can be rotated ninety degrees on its trunnions to change the size of the wedge provided by the wedge member thus enabling its use under different installation requirements.

4 Claims, 1 Drawing Sheet

WEDGE DEVICE FOR USE IN MOUNTING LIGHTS

BACKGROUND OF THE INVENTION

1. Field of the Invention

This invention relates to devices for mounting lights and similar objects and more particularly to a wedge type device which is drawn into wedging engagement between the side of a light and a mounting surface to hold the light in place.

2. Description of the Prior Art

A swimming pool light is generally mounted in a niche in the side of the pool by means of a mounting ring or similar such hardware, such ring being held to a mounting bracket installed in the niche by means of screws. After repeated replacement of the light bulb, the threaded attachment portion of the bracket will often either break off or the threads lose their holding capability so as to require the removal and replacement of the bracket, which is both time consuming and expensive. The device of the present invention obviates this problem encountered with prior art devices by providing a holding mechanism employing a wedge type locking action which obviates the need for threadably engaging the mounting bracket in mounting the light in place.

While wedge type devices for securing objects in place are well known in the prior art, the device of the present invention is believed to be unique and patentably distinct from such prior art devices in its employment of a drive member which is mounted for both pivotal and slidable motion on the wedge member to permit both lateral and rotatable adjustment of the wedge member and additionally to permit the wedge member to be alternatively used in two orientations to provide a wedge of either of two sizes, thus enabling the device of the invention to satisfy different installation requirements.

SUMMARY OF THE INVENTION

The device of the invention is particularly suitable for mounting a swimming pool light in a niche formed in the side of a swimming pool but can also be used for mounting other objects. The preferred embodiment of the invention comprises a wedge member with two pairs of wedging surfaces providing wedges of different heights. A drive member for driving the wedge member into wedging engagement with the light and mounting hardware in the pool niche is mounted on the wedge member both slidably and pivotally to permit both lateral and rotatable motion of the drive member relative to the wedge member.

A screw which threadably engages the drive member may be fitted through an aperture in a mounting ring or the like used for holding the lamp in place. With the wedge member placed between the side of the lamp and a the wall of the niche, the screw is tightened down against the mounting ring so as to draw the opposing surfaces of the wedge member tightly against the side of the lamp and the niche wall thereby wedging the lamp firmly in place. The wedge member can be converted to provide a wedge of a different width by rotating the drive member ninety degrees relative to the wedge member, the wedge member having a substantially different width when oriented in this direction.

It is therefore an object of this invention to facilitate the mounting of a pool light.

It is a further object of this invention to provide a wedge device for use in securing a light in place in a swimming pool.

It is still a further object of this invention to provide a wedge device for securing a light in place in a swimming pool which can be converted to provide wedges of different sizes.

Other objects of this invention will become apparent from the following description taken in connection with the accompanying drawings.

DETAILED DESCRIPTION OF THE INVENTION

Figure 1:
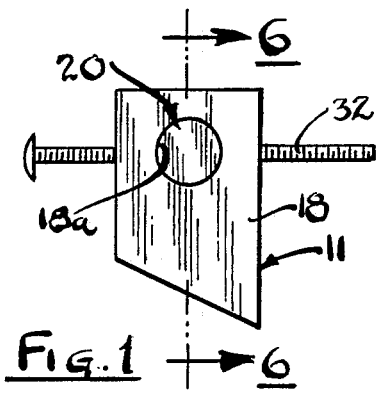
FIG. 1 is a side elevational view of a preferred embodiment of the invention.
Figure 2:
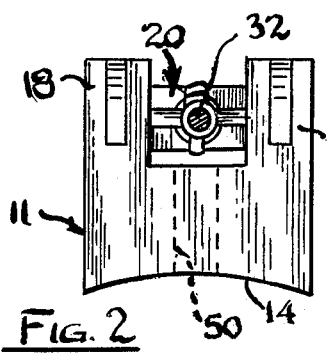
FIG. 2 is a rear elevational view of the preferred embodiment.
Figure 3:
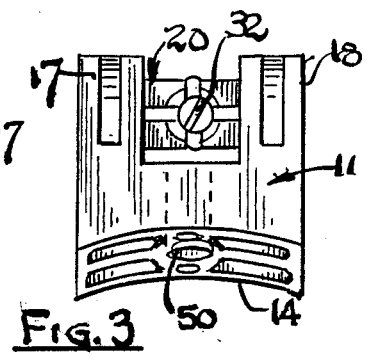
FIG. 3 is a front elevational view of the preferred embodiment.
Figure 4:
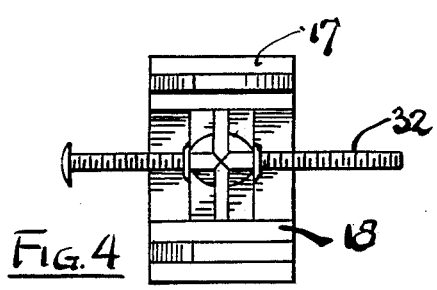
FIG. 4 is a top plan view of the preferred embodiment.
Figure 5:
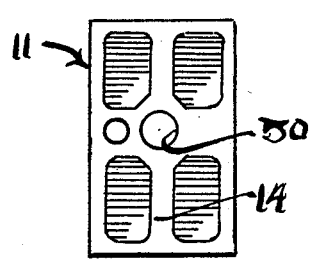
FIG. 5 is a bottom plan view of the preferred embodiment.
Figure 6:
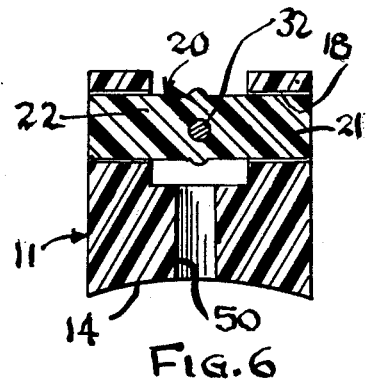
FIG. 6 is a cross sectional view taken along the plane indicated by 6—6 in FIG. 1.

Referring now to FIGS. 1-8, a preferred embodiment of the invention is illustrated.

Wedge member 11 has a bottom surface 14 which has the shape of a conical section so as to mate with the side wall of a conically shaped lamp. The wedge member has a pair of opposing arms 17 and 18 each of said arms having a circular aperture 17a and 18a respectively formed therein. Drive member 20 has a pair of trunnions 21 and 22 which are supported in sleeve bearings formed by apertures 17a and 18a for pivotal motion about the longitudinal axis of the drive member and for slidable motion along said axis. The trunnions have a spoked structure, there being a threaded aperture 30 at the center of the drive member through which screw 32 fits in threaded engagement therewith.

Figure 9:
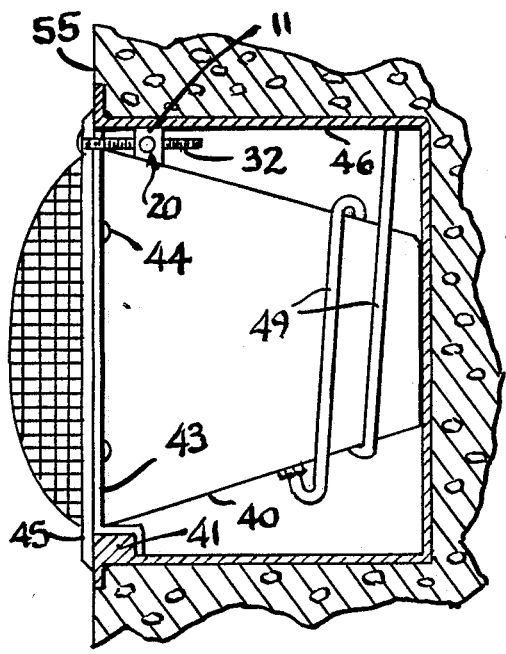
FIG. 9 is a side elevational view showing the preferred embodiment being used in retaining a pool light in place.

The device is shown in FIGS. 1-7 in a first orientation in which the wedge member provides a wider wedge. Referring to FIG. 9, the device is shown as being used to retain a pool light in place with the wedge member in this first orientation. Light 40 is mounted in niche 46 formed in the swimming pool wall 55. Power is supplied to the light 40 through cable 49. The lamp is held in place in niche 46 by means of ring member 45 which has a mounting strip 43 affixed thereto by suitable means such as bolts 44. Mounting strip 43 has a hook along the bottom edge thereof which engages tab 41 formed on the bottom of the niche. The device of the invention is installed with its bolt 32 extending through a mounting hole in ring 45 and with wedge member placed between the top wall of niche 46 and the side wall of lamp 40. Bolt 32 is then tightened against ring 45 to draw wedge member 11 into tight engagement with the niche wall and the lamp, thereby securing the lamp in place.

Figure 7:
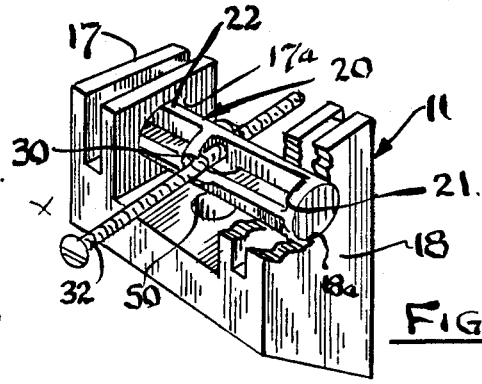
FIG. 7 is a right side perspective view of the preferred embodiment with a partial cutaway section.
Figure 8:
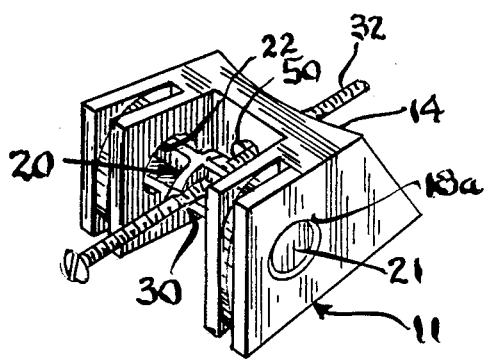
FIG. 8 is a right side perspective view of the preferred embodiment with the wedge member rotated ninety degrees from the position shown in FIG. 7.
Figure 10:
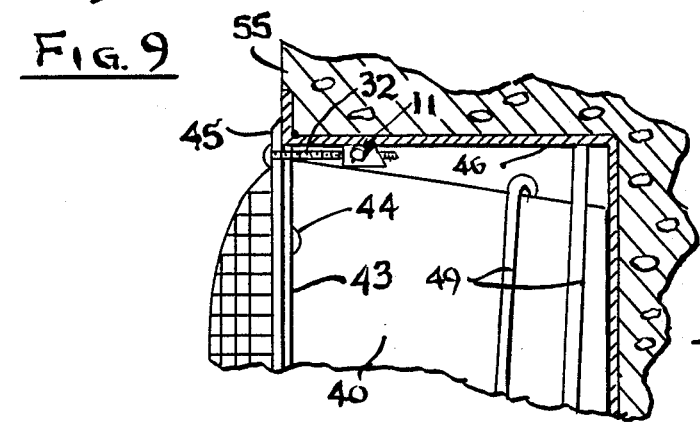
FIG. 10 is a side elevational view with partial cutaway section showing the preferred embodiment being used in retaining a pool light in place, with the wedge member turned ninety degrees from the position shown in FIG. 9.

Referring now to FIG. 8, the device of the invention is shown in its alternative configuration with the drive member 20 oriented ninety degrees from the position shown in FIG. 7. When in this position, as can be seen, screw 32 passes through aperture 50 formed in wedge member 11. Referring now additionally to FIG. 9, the use of the device of the invention set in the orientation of FIG. 8 is illustrated. As can be seen in this second orientation, the wedge member has a substantially smaller height can thus can be used in situations where the wall of lamp 40 is closer to the wall of niche 46 and forms less of an angle therewith. The device of the invention thus can be used in either of two orientations to accomodate different mounting requirements.

While the invention has been described and illustrated in detail, it is to be clearly understood that this is intended by way of illustration and example only and is not to be taken by way of limitation, the scope of the invention being limited only by the terms of the following claims.

I claim:

1. A wedge device for use in mounting an object in a niche with the wedge device wedged between a wall of the niche and a wall of the object comprising:
   an object of an appropriate size to be inserted in a niche;
   a wedge member having at least one pair of opposing wedging surfaces, said wedge member having a pair of opposing arms, there being apertures formed in each of said arms in opposing relationship to each other;
   a drive member having a pair of trunnions, said trunnions being fitted into said apertures, said apertures forming sleeve bearings which support said drive member for pivotal motion about a predetermined axis and slidable motion along said axis, and
   means connected to said drive member for drawing said drive member so as to bring the wedging surfaces of said wedge member into wedging engagement between the wall of said niche and the wall of said object with one of said wedging surfaces abutting against the wall of the niche and the other of said wedging surfaces abutting against the wall of said object, thereby retaining said object in said niche.

2. The wedge device of claim 1 wherein said wedge member has two pairs of wedging surfaces, the distance between one of said pairs of surfaces being substantially different from the distance between the other of said pairs of surfaces, said drive member being pivotally positionable alternatively in a first position whereat one of said pairs of wedging surfaces is brought into said wedging engagement and a second position whereat the other of said pairs of wedging surfaces is brought into said wedging engagement.

3. The wedge device of claim 2 wherein said means for drawing said drive member is a screw which threadably engages said drive member and mounting means on the outside of said niche, said screw engaging said mounting means.

4. A wedge device for use in mounting a light in a niche formed in the wall of a swimming pool, there being a mounting ring for holding the light in place in the niche with the wedge device wedged between a wall of the niche and a wall of the light, said ring having an aperture formed therein, said wedge device comprising:
   a wedge member having two pairs of wedging surfaces, the distance between the surfaces of one of said pairs being substantially different from the distance between surfaces of the other of said pairs, said wedge member further having a pair of opposing arms, there being circular apertures formed in each of said arms in opposing relationship to each other,
   a drive member having a pair of trunnions, said trunnions being supported in the circular apertures of said arms for pivotal motion about a predetermined axis and slidable motion along said axis whereby said drive member can be rotated at least ninety degrees relative to said wedge member, and
   screw means which threadably engages said drive member and is fitted through the aperture in said mounting ring with its head abutting against said ring whereby when said screw means is tightened against said ring the drive member and wedge member are drawn towards the ring to bring one of the pairs of wedging surfaces into wedging engagement with the wall of the niche and the wall of the light.

* * * * *